(No Model.)
O. E. WILLIAMS & J. R. BREWSTER.
GAGE FOR SAWS.
No. 353,242. Patented Nov. 23, 1886.
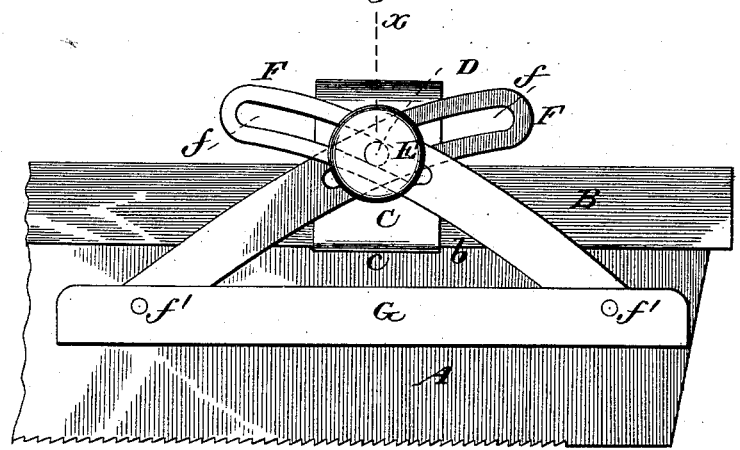
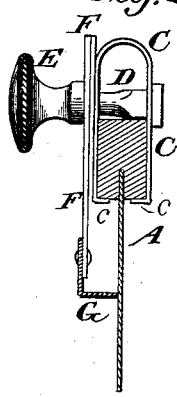
Witnesses.
A. Ruppert
Wm A Kell
Inventor.
O. E. Williams,
J. R. Brewster,
Per
Thomas P. Simpson
atty

United States Patent Office.

ORLANDO E. WILLIAMS AND JAMES R. BREWSTER, OF WINDSOR, ASSIGNORS OF ONE-THIRD TO DAVID L. SPAULDING, OF WINDSOR COUNTY, VT.

GAGE FOR SAWS.

SPECIFICATION forming part of Letters Patent No. 353,242, dated November 23, 1886.

Application filed March 18, 1886. Serial No. 195,741. (No model.)

*To all whom it may concern:*

Be it known that we, ORLANDO E. WILLIAMS and JAMES R. BREWSTER, citizens of the United States, residing at Windsor, in the county of Windsor and State of Vermont, have invented certain new and useful Improvements in Depth-Gages for Hand or Back Saws; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention will be first described in connection with the drawings, and then pointed out in the claim.

Figure 1 of the drawings is a side elevation showing my gage applied to a saw, and Fig. 2 is a vertical cross-section on line $x\ x$ of Fig. 1.

In the drawings, A represents the saw-blade, and B its back.

C is a spring-clamp, made in U shape and having the inward edge bends or flanges $c\ c$, which pass under the lower edge, $b$, of the saw-back, while just above said back passes the screw D, on which works the thumb-nut E. The screw D passes through the arc-slots $f f$ of two arms, F F, which are pivoted at $f'\ f'$ to the gage G. By moving the arms, which cross each other on the screw, the gage may be adjusted so that the saw will cut to any required depth, the nut being turned down on the screw until the spring C is securely clamped to the saw-back and the arms to the spring.

The gage may be worked upon either side of the saw, while the whole is secured to its adjustment by a single thumb-nut.

One great advantage of our gage is that it may be fitted to any saw without the necessity of puncturing or disfiguring it; secondly, the arrangement of the parts allows them to be folded close to the saw-back, so as to be out of the way and not liable to be bent or broken.

We are aware that gages have been used with rigid upright bars extending above the back of the saw and clamped thereto, and also that straight slotted arms have been jointed to a bar; but

What we claim as new, and desire to protect by Letters Patent, is—

The combination, with a gage, G, of the arc-slotted arms F F, pivoted to and near each end of said gage, the U-shaped spring-clamp C, having edge flanges, $c\ c$, which fit under the lower edges of saw-back, and the screw D, passing through said spring-clamp, as well as through the slotted arms, substantially as shown and described.

In testimony whereof we affix our signatures in presence of two witnesses.

ORLANDO E. WILLIAMS.
JAMES R. BREWSTER.

Witnesses:
WM. BATCHELDER,
D. L. SPAULDING.